(12) United States Patent
Tanaka et al.

(10) Patent No.: US 7,016,001 B2
(45) Date of Patent: Mar. 21, 2006

(54) MVA-LCD DEVICE WITH COLOR FILTERS ON A TFT ARRAY SUBSTRATE

(75) Inventors: Sakae Tanaka, Taoyuan Hsien (TW); Seok Lyul Lee, Toayuan Hsien (TW)

(73) Assignee: Hannstar Display Corp., Taiwan (TW)

( * ) Notice: Subject to any disclaimer, the term of this patent is extended or adjusted under 35 U.S.C. 154(b) by 0 days.

(21) Appl. No.: 10/100,372

(22) Filed: Mar. 14, 2002

(65) Prior Publication Data

US 2003/0174269 A1 Sep. 18, 2003

(51) Int. Cl.
*G02F 1/1333* (2006.01)

(52) U.S. Cl. .................. 349/138; 349/129; 349/130
(58) Field of Classification Search ............ 349/138, 349/129, 130, 106, 122, 123, 113, 141
See application file for complete search history.

(56) References Cited

U.S. PATENT DOCUMENTS

| 5,808,717 A | * | 9/1998 | Van Aerle | 349/129 |
| 6,507,382 B1 | * | 1/2003 | Sakamoto et al. | 349/141 |
| 6,567,144 B1 | * | 5/2003 | Kim et al. | 349/128 |

* cited by examiner

*Primary Examiner*—Kenneth Parker
*Assistant Examiner*—David Chung
(74) *Attorney, Agent, or Firm*—Rabin & Berdo, P.C.

(57) ABSTRACT

An MVA-LCD device has a first glass substrate and a second glass substrate disposed in parallel to each other. A plurality of transverse-extending scanning electrodes and lengthwise-extending signal electrodes are patterned on the first glass substrate to define a plurality of pixel areas. A color resin layer is formed on the signal electrodes, and an organic insulator is formed on the color resin layer. Also, at least a first protrusion is formed in the organic insulator within each pixel area. A plurality of pixel electrodes is formed on the organic insulator and the first protrusions to cover each pixel area of the first glass substrate.

19 Claims, 5 Drawing Sheets

MVA-LCD DEVICE WITH COLOR FILTERS ON A TFT ARRAY SUBSTRATE

BACKGROUND OF THE INVENTION

1. Field of the Invention

The present invention relates to a multi-domain vertical alignment LCD (MVA-LCD) device and, more particularly, to an MVA-LCD device with color filters on a TFT array substrate for improving transmittance.

2. Description of the Related Art

To obtain a super-high image quality in LCDs for large-screen display products, multi-domain vertical alignment (MVA) mode LCD that provides high contrast ratio, rapid response time and wide view angle has been developed. Since using conventional rubbing method is difficult in controlling liquid crystal (LC) domains in MVA-LCD device, protrusions designed on the TFT array substrate and the color filter substrate, are employed to control the LC alignment automatically. This alignment technique is named ADF (automatic domain formation). The slopes of the protrusions can create either two or four kinds of domains to ensure ease in mass production.

FIG. 1A is a top view showing an MVA-LCD device according to the prior art. FIG. 1B is a sectional diagram along line I—I shown in FIG. 1A. The conventional MVA-LCD device 10 has a TFT array substrate 12I, a color filter substrate 12II, and a liquid crystal (LC) layer 14 formed in the space between the two parallel substrates 12I and 12II. On the TFT array substrate 12I, a plurality of transverse-extending scanning electrodes 16 and a plurality of lengthwise-extending signal electrodes 18 define square-shaped pixel areas arranging in a matrix form. Each of the pixel areas in covered by a pixel electrode 20, and has a TFT structure 19 near the intersection of the scanning electrode 16 and the signal electrode 18. Also, a plurality of lengthwise-extending first protrusions 22I is patterned on the pixel electrode 20, and covered by a first alignment layer 24I. Each of the first protrusions 22I is formed on the center region of each pixel area.

On the color filter substrate 12II, a plurality of black matrix layers 26 and a color resin layer 28 are stacked, and a plurality of transverse-extending common electrode 29 is formed on the color resin layer 28 to pass through pixel areas. Also, a plurality of lengthwise-extending second protrusions 22II are patterned on the common electrode 29, and covered by a second alignment layer 24II that faces the LC layer 14. Two of the second protrusions 22II are formed on the two sides of each pixel area.

The profile of the protrusions 22I and 22II can contribute to a multi-domain cell through a combination of pre-tilt control and a fringe electric field. Preferably, the first protrusion 22I is formed as a triangle profile, and the second protrusion 22II is formed as a reversed-triangle profile. For the LC molecules near the sidewalls of the protrusions 22I and 22II, the slope of the protrusions 22I and 22II causes the LC molecules tilt in a desired direction either when a voltage is applied across the pixel area or not. For the LC molecules away from the sidewalls of the protrusions 22I and 22II, the slope of the protrusions 22I and 22II and the lateral electric field cause the LC molecules tilt in a desired direction when a voltage is applied across the pixel area.

However, the first protrusions 22I on the TFT array substrate 12I and the second protrusions 22II on the color filter substrate 12II result in a low transmittance in the MVA-LCD device 10. Also, these protrusions 22I and 22II encounter a problem of high product costs.

SUMMARY OF THE INVENTION

The present invention provides an MVA-LCD device with color filters in the TFT array substrate to solve the above-mentioned problems.

The MVA-LCD device has a lower glass substrate and an upper glass substrate disposed in parallel to each other. A plurality of transverse-extending scanning electrodes and lengthwise-extending signal electrodes are patterned on the lower glass substrate to define a plurality of pixel areas. A color resin layer is formed on the signal electrodes, and an organic insulator is formed on the color resin layer. Also, at least a first protrusion is formed in the organic insulator within each pixel area. A plurality of pixel electrodes is formed on the organic insulator and the first protrusions to cover each pixel area of the lower glass substrate.

Accordingly, it is a principal object of the invention to permit an increased transparent area to achieve a super high aperture ratio in the MVA-LCD device.

It is another object of the invention to reduce coupling between the signal electrode and the pixel electrode.

Yet another object of the invention is to form the black matrix layers as protrusion to reduce product costs.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
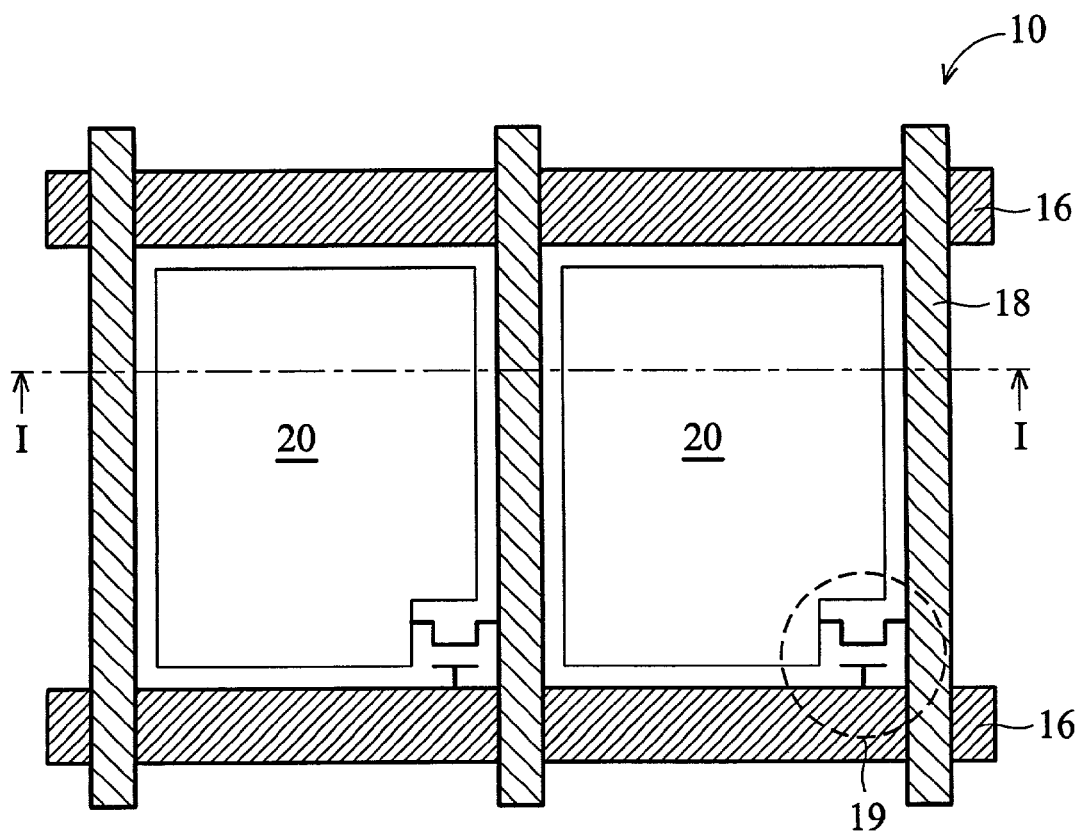
FIG. 1A is a top view showing an MVA-LCD device according to the prior art.
Figure 1B:
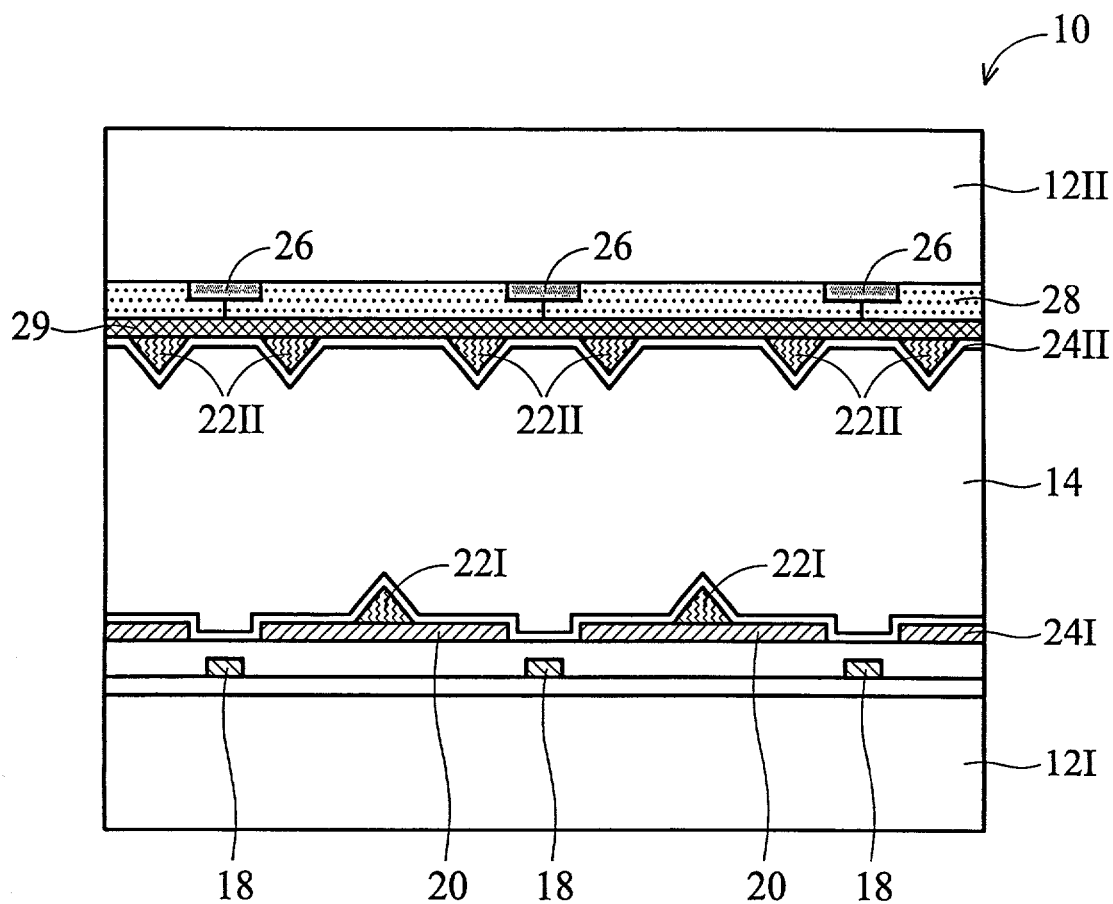
FIG. 1B is a sectional diagram along line I—I shown in FIG. 1A.
Figure 2A:
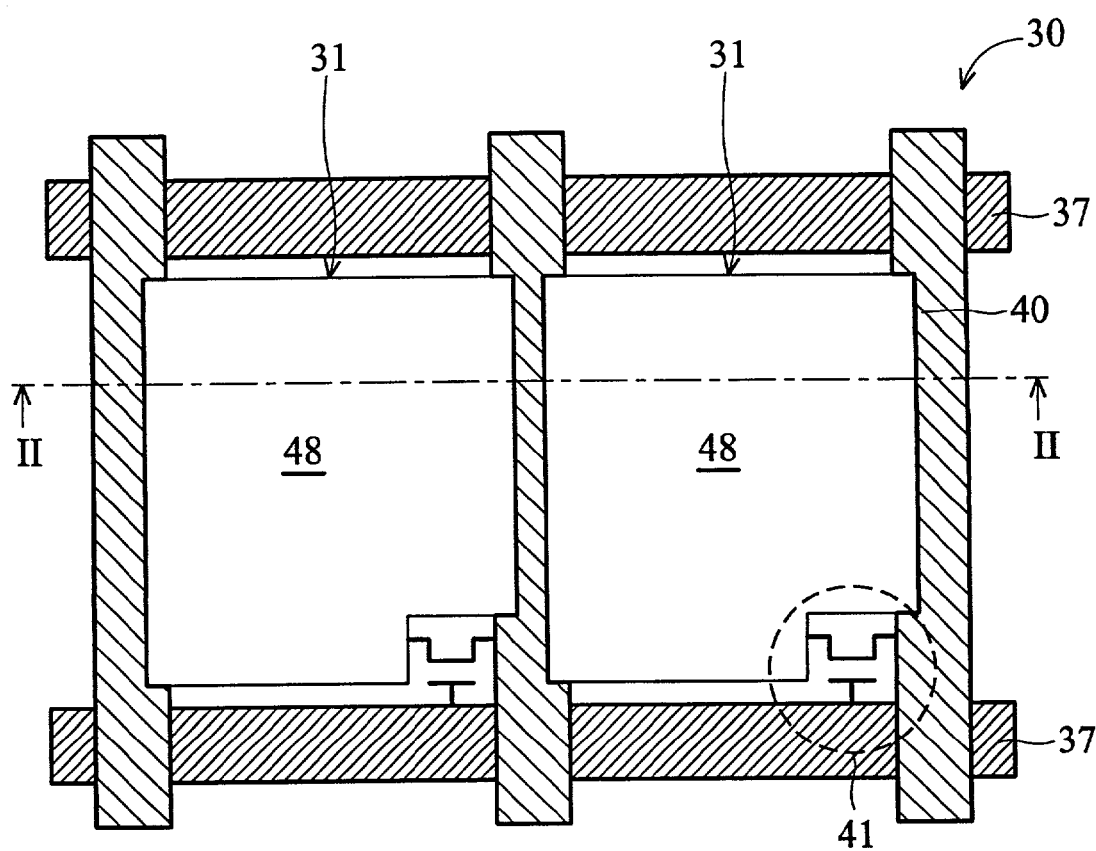
FIG. 2A is a top view showing an MVA-LCD device according to the present invention.
Figure 2B:
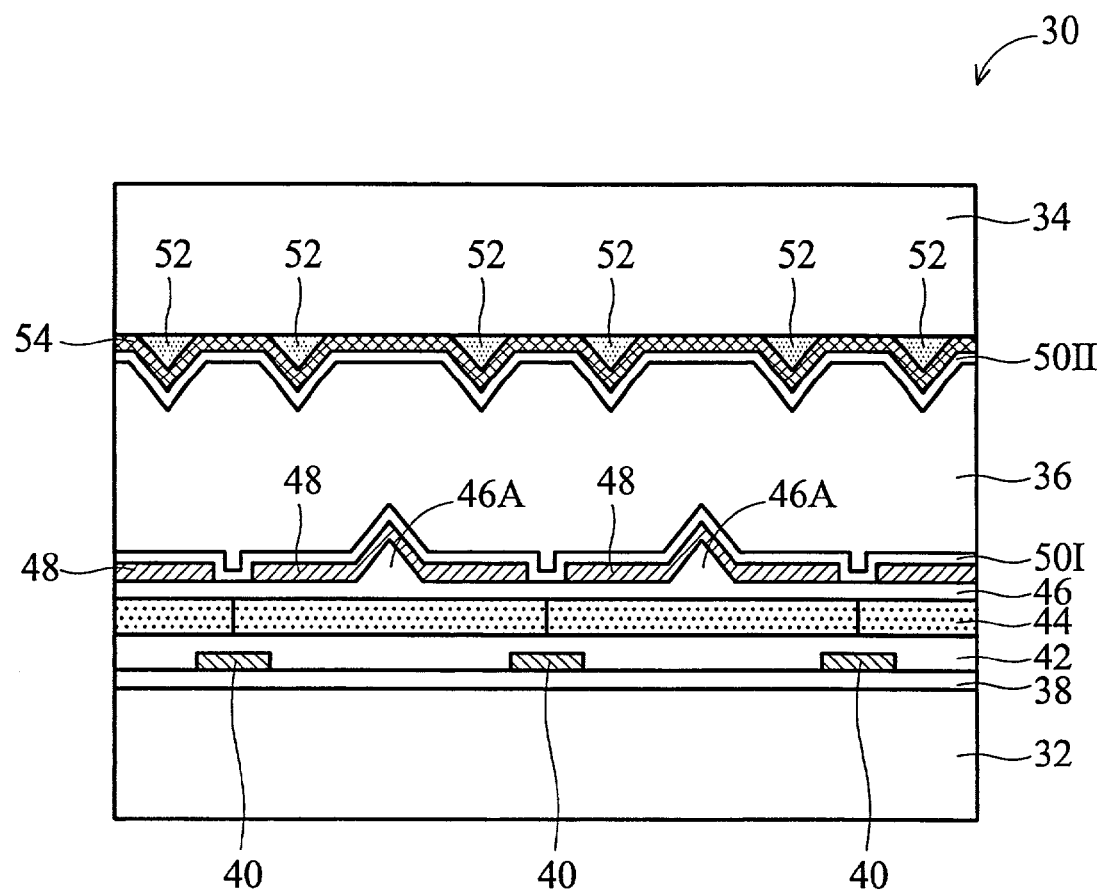
FIG. 2B is a sectional diagram along line II—II shown in FIG. 2A.

FIG. 2A is a top view showing an MVA-LCD device according to the present invention. FIG. 2B is a sectional diagram along line II—II shown in FIG. 2A. The MVA-LCD device 30 has a lower glass substrate 32, an upper glass substrate 34, and a liquid crystal (LC) layer 36 of a negative anisotropic electric constant formed in the space between the two parallel substrates 32 and 34. On the lower glass substrate 32, serving as a TFT array substrate, a plurality of transverse-extending scanning electrodes 37 are patterned and then covered by a gate insulating layer 38. Next, a plurality of lengthwise-extending signal electrodes 40 are patterned on the gate insulating layer 38. Thus, the scanning electrodes 37 and the signal electrodes 40 arranges in a matrix form to define approximately square-shaped pixel areas 31. Next, depending on well-known technologies, a TFT structure 41 can be formed on a predetermined area near the scanning electrodes 37 and the signal electrodes 40 within each pixel area 31.

Next, after depositing an insulating layer 42 on the entire surface of the lower glass substrate 32, a color resin layer 44 of more than 1 μm is formed on the insulating layer 42 to serve as R, G, B color filters. Then, a photosensitive organic insulator 46 of more than 1 μm is formed on the color resin layer 44. Thereafter, in slit process, photolithography and etching with an attenuated mask and a positive-type photoresist are employed to form a plurality of first protrusions 46A of 1~2 μm thick on the organic insulator 46. Preferably, the first protrusion 46A is formed on the center region of each pixel area 31.

Figure 3:
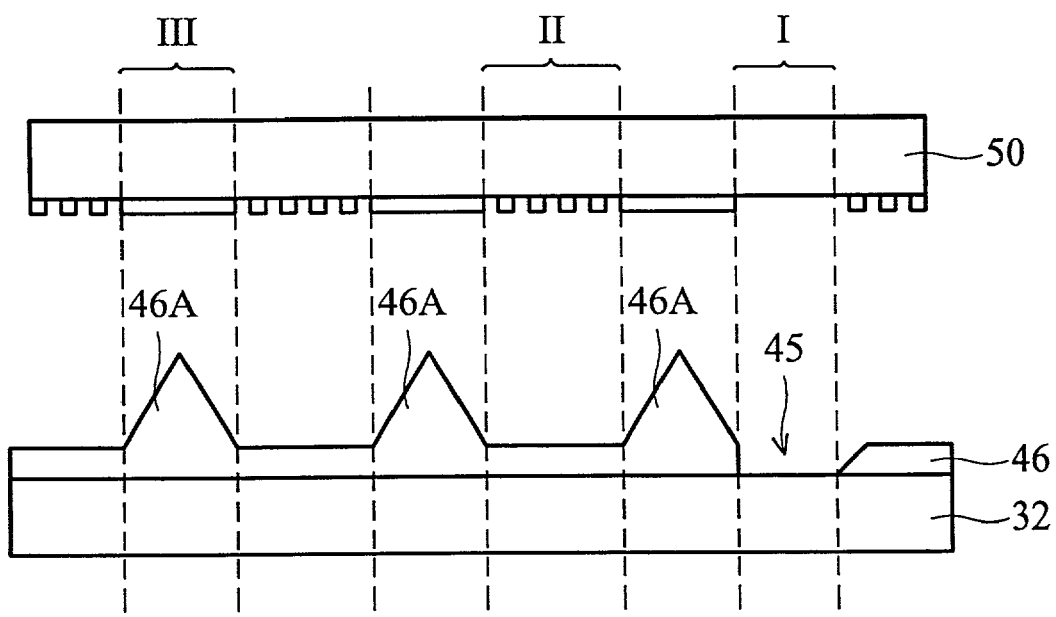
FIG. 3 is a sectional diagram showing the slit process according to the present invention.

Please refer to FIG. 3, which is a sectional diagram showing the slit process. The attenuated mask 50 comprises a quartz plate and a cap layer that is defined as a first area I, a second area II, and a third area III. The first area I of more than 4 μm×4 μm area, made of transparent materials, has 100% transparency to serve as a completely transmitted area. The second area II is preferred MoSi of 500~1000 Å that has 50~60% transparency to serve as a half transmitted area, in which a slit pattern preferably consists of 0.5~1.5 μm pattern width and 0.5~1.5 μm space width for controlling the thickness of the organic insulator 46. The third area III of more than 4 μm×4 μm area, preferred made of chromium (Cr), has approximately 0% transparency to serve as a completely blocking are. In photolithography, since the attenuated mask 50 has three transparencies in the areas I, II and III, corresponding areas on the positive-type photoresist respectively receive different light intensity to achieve an incomplete exposure result. Therefore, each etched depth of the corresponding areas on the positive-type photoresist is different, resulting in different etch depth of the corresponding areas on the organic insulator 46 during the subsequent etching. The first protrusions 46A are formed under the third area III, and a via hole 45 can be formed under the first area I. Also, the first protrusion 46A, having a inclined angle between 20~40 degree, may be formed as a triangle profile or a trapezoid-shaped profile to provide slopes. In addition, if the relationship between the areas I, II and III is appropriately replaced, the attenuated mask 50 can be applied in shaping a negative-type photoresist to the same profile.

Referring to FIG. 2, a pixel electrode 48 of indium tin oxide (ITO) is conformally deposited on the organic insulator 46 and the protrusions 46A, and then patterned to cover each pixel area 31. The boundary of the pixel electrode 48 extends to cover part of the signal electrode 40. Finally, a first alignment layer 501 is formed on the entire surface of the lower glass substrate 32.

On the upper glass substrate 34, a plurality of black matrix layers 52 is patterned and then covered by a plurality of transverse-extending common electrodes 54 that across pixel areas 31. The black matrix layer 52 may be formed by using Cr metal or black resin material. Preferably, the black resin material is employed to ensure ease in mass production. Also, the above-described slit process can be used to form the black matrix layers 52. The common electrode 54 is formed by using transparent materials, such as indium tin oxide (ITO). Finally, a second alignment layer 5011 is formed on the entire surface of the upper glass substrate 34 to face the LC layer 36.

Figure 4:
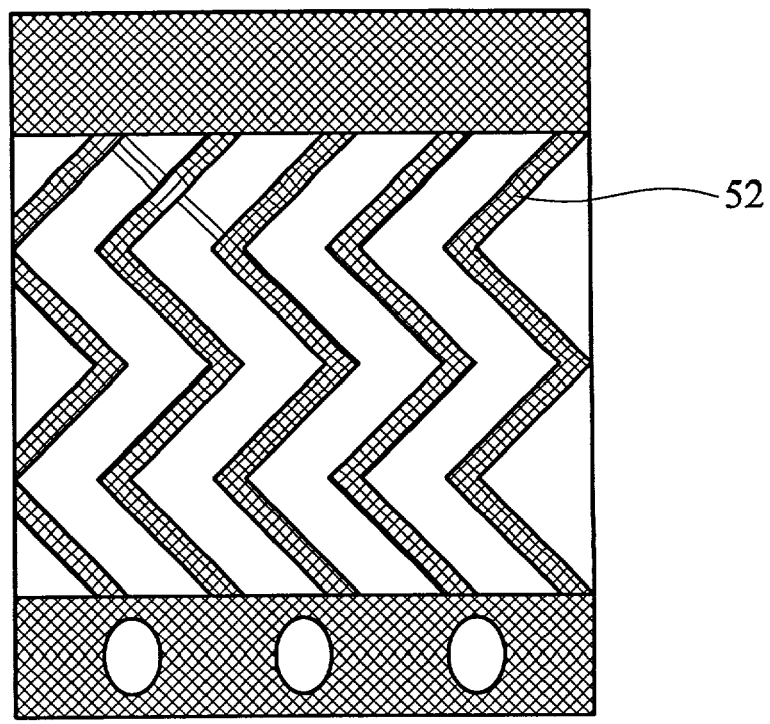
FIG. 4 is a top view shown the black matrix layers according to the present invention.

It is noticed that the black matrix layers 52, used for preventing induced light from the TFT array substrate 32, are formed as a triangle-profile with a inclined angle between 20~40 degree to serve as second protrusions 52 of 1~2 μm thick. Thus, in the pixel area 31, the slopes of first protrusion 46A and the second protrusions 52 can automatically control the LC molecules alignment to create multi-domains. Also, the black matrix layer 52 can be patterned as a zig-zag extending profile to further improve domains in each pixel area 31, as a top view shown in FIG. 4.

Compared with the conventional MVA-LCD device, the color filters are integrated in the TFT array substrate 30 of the MVA-LCD device 30, thus permits an increased transparent area to achieve a super high aperture ratio. Also, the organic insulator 46 and the color resin layer 44 are interposed between the pixel electrode 48 and the signal electrode 40 to reduce coupling therebetween. Moreover, there is no need to form any black matrix in the color filters to prevent light leakage between the pixel electrode 48 and the signal electrode 40. This improves the aperture ratio of the MVA-LCD device 30. Furthermore, the black matrix layers 52 on the upper glass substrate 34 can serve as the protrusions to control LC molecules alignment without forming extra protrusions on the common electrode 54. This reduces product costs.

It is to be understood that the present invention is not limited to the embodiments described above, but encompasses any and all embodiments within the scope of the following claims.

What is claimed is:

1. A liquid crystal display (LCD) device, comprising:
   a first glass substrate and a second glass substrate disposed in parallel to each other;
   a plurality of transverse-extending scanning electrodes and a plurality of lengthwise-extending signal electrodes patterned on the first glass substrate to define a plurality of pixel areas;
   a color resin layer formed on the signal electrodes;
   an organic insulator formed on the color resin layer, wherein the organic insulator has at least a first protrusion within each pixel area; and
   a plurality of pixel electrodes formed on the organic insulator and the first protrusions to cover each pixel area of the first glass substrate,
   a plurality of black matrix layers patterned on the second glass substrate, wherein the black matrix layers serves as a plurality of second protrusions in each pixel area; and
   a plurality of transverse-extending common electrodes patterned on the black matrix layers.

2. The LCD device according to claim 1, wherein the first protrusion comprises a sidewall of an inclined angle between 20 degree and 40 degree.

3. The LCD device according to claim 1, wherein the first protrusion has a triangle profile or a trapezoid profile.

4. The LCD device according to claim 1, wherein at least two of the second protrusions are formed within each pixel area.

5. The LCD device according to claim 1, wherein the second protrusion comprises a sidewall of an inclined angle between 20 degree and 40 degree.

6. The LCD device according to claim 1, wherein the second protrusion has a triangle profile or a trapezoid profile.

7. The LCD device according to claim 1, wherein the black matrix layer is formed as a zigzag extending pattern.

8. The LCD device according to claim 1, further comprising a liquid crystal layer of a negative anisotropic electric constant formed in the space between the first glass substrate and the second glass substrate.

9. The LCD device according to claim 1, further comprising a TFT structure on each pixel area of the first glass substrate.

10. The LCD device according to claim 1, wherein the color resin layer is more than 1 μm thick.

11. The LCD device according to claim 1, wherein the organic insulator is more than 1 μm thick.

12. The LCD device according to claim 1, wherein the first protrusion on the organic insulator is formed by using slit process.

13. The LCD device according to claim 12, wherein the slit process uses an attenuated mask having at least three transparencies.

14. The LCD device according to claim 13, wherein the attenuated mask comprises a completed transmitted area, a half transmitted area and a completed blocking area.

15. The LCD device according to claim 14, wherein the half transmitted area comprises a slit pattern of 0.5~1.5 $\mu$m pattern width and 0.5~1.5 $\mu$m space width.

16. The LCD device according to claim 14, wherein the half transmitted area is formed by coating a MoSi layer of 500~1000 Å.

17. The LCD device according to claim 14, wherein the completed transmitted area is used for patterning the first protrusion on the organic insulator.

18. The LCD device according to claim 14, wherein the size of the completed transmitted area is more 4 $\mu$m×4 $\mu$m.

19. The LCD device according to claim 14, wherein the size of the completed blocking area is more 4 $\mu$m×4 $\mu$m.

* * * * *